Figure 1:
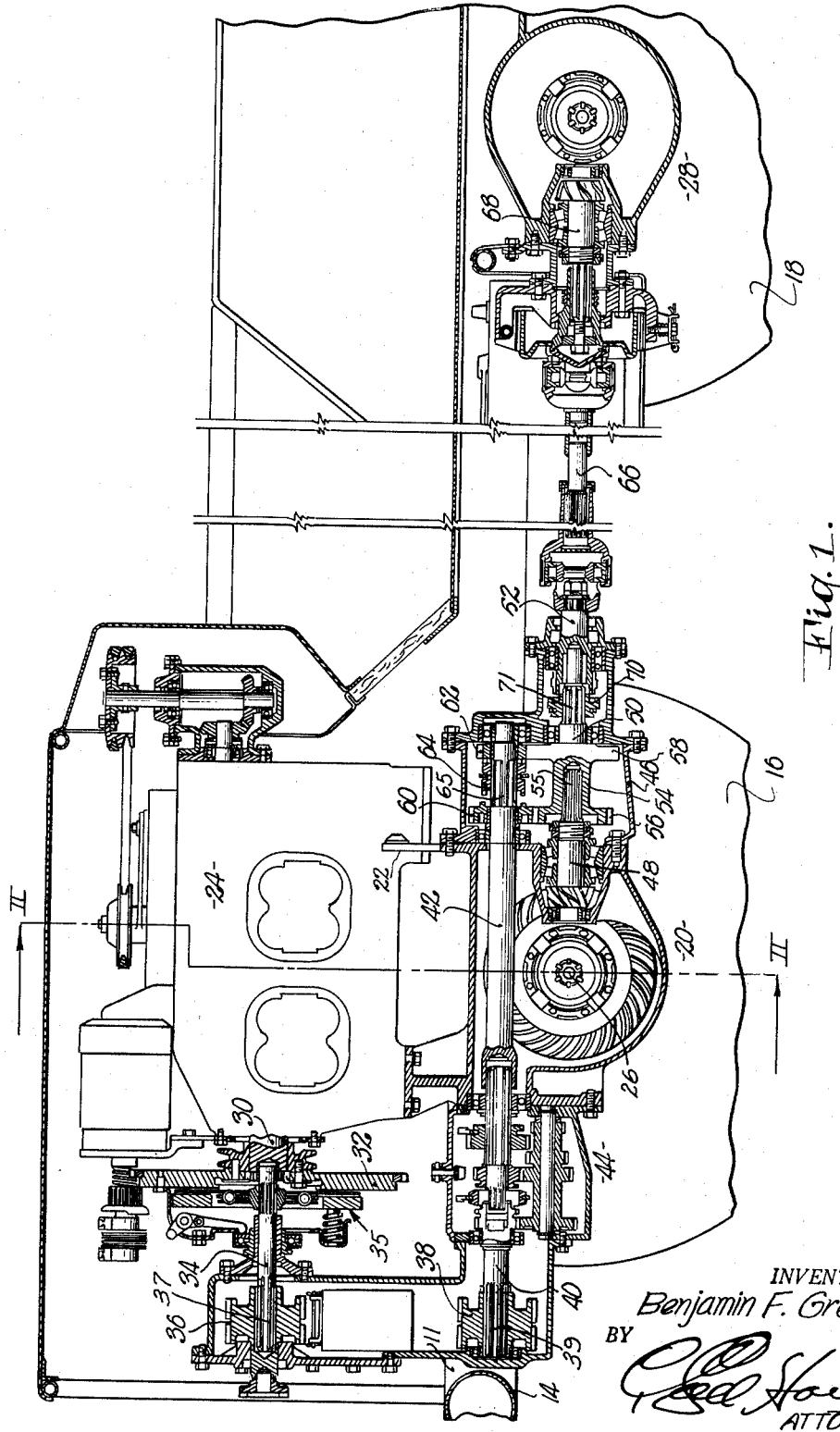

Aug. 9, 1955   B. F. GREGORY   2,714,936
VEHICLE WITH FOUR WHEEL DRIVE ASSEMBLY
Filed Jan. 2, 1952   2 Sheets-Sheet 1

INVENTOR.
Benjamin F. Gregory
BY
ATTORNEY.

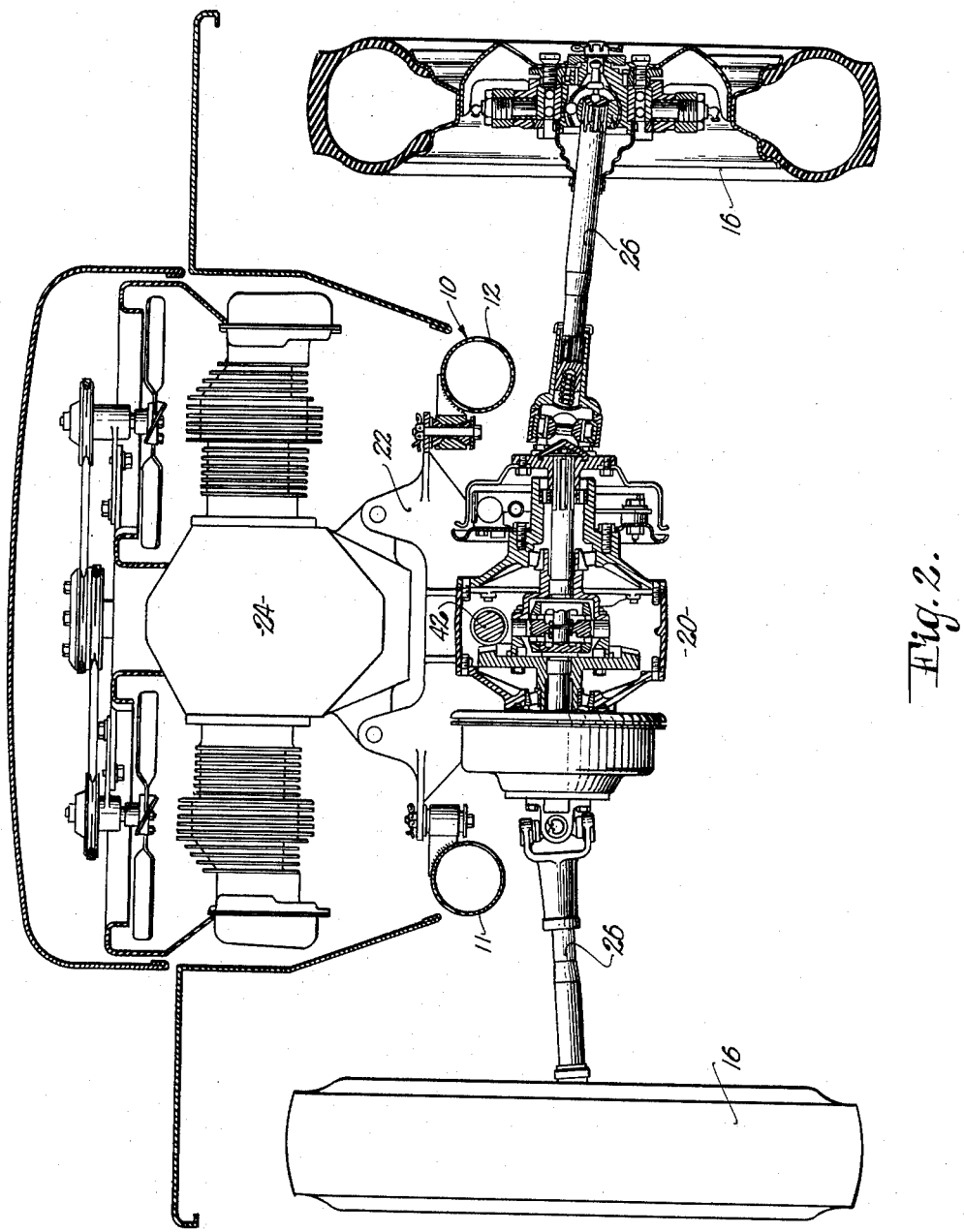

United States Patent Office 2,714,936
Patented Aug. 9, 1955

2,714,936

VEHICLE WITH FOUR WHEEL DRIVE ASSEMBLY

Benjamin F. Gregory, Kansas City, Mo., assignor, by mesne assignments, to Marco Mfg. Company, Wheatland, Pa., a corporation Application January 2, 1952, Serial No. 264,572

1 Claim. (Cl. 180—44)

This invention relates to improvements in automotive vehicles, the primary object being to provide novel structure for interconnecting an internal combustion engine or other prime mover with the four wheels of the vehicle in a manner to permit short couplings so far as the length of the wheel base is concerned, and to provide a wheel balance assembly occupying very little space and adapted therefore for advantageous use more particularly by the military.

It is an important object of the present invention to provide a four wheel drive vehicle including a single prime mover, together with a pair of differential gearings, a selective transmission and reversing means common to the differentials and means for rendering either the front differential alone or both differentials together optionally operable, all of such structure being arranged so as to occupy little space and to provide an over-all assembly that is well balanced and short coupled to reduce the size of the vehicle without sacrifice of power and efficiency of performance.

Another important object hereof is to provide in a mobile vehicle, an auxiliary shaft underlying the prime mover and interconnecting the selective transmission as well as the differential gearings, there being means for optionally connecting such shaft with either one differential gearing alone or both simultaneously, together with reversing means, all located substantially beneath the prime mover for the aforesaid reasons.

Other objects include details of construction and the manner of coupling the aforementioned parts, all of which will be made clear or become apparent as the following specification progresses.

In the drawing:

Figure 1 is a substantially central, vertical, cross-sectional view of a power transmission assembly for vehicles made pursuant to the present invention; and Fig. 2 is a vertical, cross-sectional view taken on irregular line II—II of Fig. 1.

The vehicle illustrated in the drawings includes a rectangular frame 10, having a pair of parallel side beams 11 and 12 connected at their ends by cross-members 14. A pair of front wheels 16 and a pair of rear wheels 18, are suitably joined to the frame 10.

A front differential gearing broadly designated by the numeral 20, is carried by framework 22 for mounting a prime mover 24 upon the frame 10. Differential gearing 20 is operably connected with the front wheels 16 through the medium of shafts 26 having a plurality of universal couplings as illustrated in Fig. 2, for permitting steering and swinging of the front wheels 16 vertically with respect to the remaining parts of the vehicle as determined by the nature of the terrain.

A rear differential broadly designated by the numeral 28, is similarly mounted on the frame 10 and operably coupled with the rear wheels 18.

It is contemplated that the prime mover 24 constitutes any suitable internal combustion engine having a forwardly extending crank shaft 30 to which is attached a flywheel 32 and a forwardly extending stub shaft 34 having a gear or sprocket wheel 36 splined as at 37 or otherwise suitably mounted rigidly thereon. The shafts 30 and 34 are preferably coupled through a clutch mechanism such as indicated broadly by the numeral 35 in Fig. 1. A similar gear or sprocket wheel 38 is splined as at 39 or otherwise rigidly mounted on a stub shaft 40 immediately below the sprocket wheel 36 and these two elements 36 and 38 are coupled by a chain not shown. In lieu of such connection, a train of gears may be provided between stub shafts 34 and 40 to operably interconnect the same. A driven shaft 42 directly underlying the engine 24 above the differential gearing 20, is in parallelism with the crank shaft 30 and is coupled with the stub shaft 40 through the medium of a selective transmission broadly designated by the numeral 44 and disposed beneath the flywheel 32 forwardly of the differential gearing 20.

A gear box 46 beneath the prime mover 24 and rearwardly of the differential gearing 20, receives the rearmost end of the driven shaft 42, together with stub shafts 48, 50 and 52, shaft 48 being the main driving member of the differential gearing 20.

A hub 54 within the gear box 46 rigidly interconnects the shafts 48 and 50 and is provided with a pair of spaced, parallel gears 56 and 58. To accomplish such interconnection between the shafts 48 and 50, the shaft 50 may be formed as an integral portion of the hub 54 and the shaft 48 may be splined to the hub 54 as at 55. A pair of gears 60 and 62 rotatable on the shaft 42, are in mesh with gears 56 and 58 respectively.

A coupling element 64 mounted on the shaft 42 for rotation therewith is splined as at 65 for reciprocable movement between the gears 60 and 62 to selectively interconnect the same. Accordingly, through the medium of a connection with coupling 64 by manual mechanism not herein shown, either the differential gearing 20 alone or both differential gearings 20 and 28, as will hereinafter be more fully explained, may be geared for increased power as desired.

A shaft 66 provided with suitable universal joints interconnects the main driving member 68 of rear differential gearing 28 with the shaft 52. A coupling member 70 splined as at 71 on the shaft 50 for rotation therewith is reciprocable to and from a position connected with the shaft 52. Accordingly, through the medium of suitable manually controlled means not herein shown, the coupling 70 may be shifted to connect the rear differential gearing 28 with the engine 24 as desired.

It is seen that the front wheels 16 are driven at all times either forwardly or in reverse as determined by the selection made in transmission 44. This connection is from crank shaft 30 to stub shaft 34, gearing 36—38, shaft 40, transmission 44, shaft 42, gears 60 or 62 depending upon the positioning of coupling 64, gears 56 or 58, driving member 48, differential gearing 20 and shafts 26 to wheels 16. It is seen that irrespective of the position of selective transmission 44, either forwardly or in reverse, the coupling 64 may be shifted to drive the differential gearing 20 through either gear 60 or gear 62. In the event it is desired to also drive the rear wheels 18, the operator merely shifts the coupling 70 into connection with shaft 52, whereupon selective transmission 44, as well as the coupling 64, may be operated to suit the desires of the operator.

Many details of construction of the aforementioned parts are illustrated in the drawings for purposes of clarification, but since the same may be of conventional character, additional detailed description is believed unnecessary. In other words, the particular type of differential mechanisms 20 and 28 that are used for this system, may vary and likewise, the type of selective transmission 44 that is used, as well as the nature of the braking for the wheels, can be varied without departing from the primary and important features of the power transmission hereof.

A novel arrangement of the prime mover 24 directly above the front differential gearing 20, the utilization of shaft 42 between the engine 24 and the differential gearing 20, and the train of gearing and the like between the crank shaft 30 and the differentials 20 and 28, are all highly important to the achievement of the ends initially set forth herein. The distance between the differentials 20 and 28 may be varied, presenting a very short wheel base if desired, and it is also seen that the entire assembly shown in the drawings, interferes in no way with the provision of a suitable body above the shaft 66 and differential gearing 28 rearwardly of the engine 24.

Accordingly, such changes and modifications of the various details aforementioned that fairly come within the spirit of this invention as defined by the scope of the appended claim, are contemplated hereby.

Having thus described the invention what is claimed as new and desired to be secured by Letters Patent is:

In a power transmission for vehicles having a pair of front wheels and a pair of rear wheels, a prime mover having a normally horizontal drive shaft extending forwardly therefrom; a first stub shaft in alignment with the drive shaft and disposed forwardly thereof; clutch means between the first stub shaft and the drive shaft for releasably interconnecting the same; a second stub shaft underlying and parallel to the first stub shaft; means coupling the first stub shaft with the second stub shaft; a driven shaft underlying the prime mover and disposed in alignment with and rearwardly of the second stub shaft; a selective transmission coupling the driven shaft with the second stub shaft and disposed therebetween; a front differential gearing connected to the front wheels and underlying the prime mover, said front differential gearing having a rearwardly extending, main driving member underlying and parallel to the driven shaft; a gear box assembly coupling the member with the driven shaft adjacent the rear of the latter; a rear differential gearing connected to the rear wheels, said rear differential gearing having a forwardly extending, main driving element in substantial alignment with the member; and coupling means disposed between the member and the element including selectively shiftable, releasable structure for alternately, positively intercoupling and decoupling the member with the element, said gear box assembly coupling the member with the driven shaft including a pair of gears of differing diameters rigidly carried by the member, a corresponding pair of gears rotatably mounted on the driven shaft and continuously in mesh with said gears on the member, and a device reciprocably mounted on the driven shaft for rotation therewith, said device being shiftable along the driven shaft between a pair of alternate positions respectively, disposing the device in positive engagement with each of said gears on the driven shaft.

References Cited in the file of this patent

UNITED STATES PATENTS

| | | |
|---|---|---|
| 1,114,245 | Fitch | Oct. 20, 1914 |
| 1,209,290 | Hassell | Dec. 19, 1916 |
| 1,219,529 | Batenburg | Mar. 20, 1917 |
| 1,294,198 | Timberlake | Feb. 11, 1919 |
| 1,529,932 | Smith | Mar. 17, 1925 |
| 1,592,970 | Dernier | July 20, 1926 |
| 1,953,749 | Curtis | Apr. 3, 1934 |
| 2,162,334 | Herrington | June 13, 1939 |
| 2,578,156 | Smith | Dec. 11, 1951 |

FOREIGN PATENTS

| | | |
|---|---|---|
| 176,851 | Great Britain | Mar. 23, 1922 |
| 824,285 | France | Nov. 3, 1937 |